(12) United States Patent
Adachi (10) Patent No.: US 11,137,968 B2
(45) Date of Patent: Oct. 5, 2021

(54) SCREEN-CREATION ASSISTANCE DEVICE, DISPLAY SYSTEM, SCREEN-CREATION ASSISTANCE METHOD, AND RECORDING MEDIUM

(71) Applicant: Mitsubishi Electric Corporation, Tokyo (JP)

(72) Inventor: Satoru Adachi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/965,606

(22) PCT Filed: Mar. 8, 2018

(86) PCT No.: PCT/JP2018/009058
§ 371 (c)(1),
(2) Date: Jul. 29, 2020

(87) PCT Pub. No.: WO2019/171548
PCT Pub. Date: Sep. 12, 2019

(65) Prior Publication Data
US 2020/0379706 A1   Dec. 3, 2020

(51) Int. Cl.
*G06F 3/14* (2006.01)
*G06F 3/0484* (2013.01)

(52) U.S. Cl.
CPC ........ *G06F 3/1446* (2013.01); *G06F 3/04845* (2013.01); *G06F 2203/04803* (2013.01)

(58) Field of Classification Search
CPC ......... G06F 2203/04803; G06F 3/0481; G06F 3/04845; G06F 3/1446; G09G 2340/04
See application file for complete search history.

(56) References Cited

U.S. PATENT DOCUMENTS 9,804,731 B1 * 10/2017 Baloga ...................... G06F 1/16
2005/0017957 A1 * 1/2005 Yi ....................... G06F 3/04886
345/173

(Continued)

FOREIGN PATENT DOCUMENTS

CN   106502527 A   3/2017
JP   10-004630 A   1/1998

(Continued)

OTHER PUBLICATIONS

International Search Report and Written Opinion dated May 22, 2018 for PCT/JP2018/009058 filed on Mar. 8, 2018, 7 pages including English Translation of the International Search Report.

(Continued)

*Primary Examiner* — Chun-Nan Lin
(74) *Attorney, Agent, or Firm* — Xsensus LLP (57) ABSTRACT

A screen-creation assistance device includes a screen-data-element generation unit to generate a first screen data element that is a screen data element of a first screen, a division unit to divide the first screen into a plurality of second screens to be displayed respectively on a plurality of display devices, and to generate a plurality of second screen data elements that are respective screen data elements of the second screens, and an output unit to output the second screen data elements.

14 Claims, 9 Drawing Sheets

(56) References Cited

U.S. PATENT DOCUMENTS

| | | | |
|---|---|---|---|
| 2010/0185183 A1* | 7/2010 | Alme | G16H 40/63 |
| | | | 604/891.1 |
| 2010/0248788 A1* | 9/2010 | Yook | G06F 3/1415 |
| | | | 455/566 |
| 2011/0302528 A1* | 12/2011 | Starr | G06F 9/451 |
| | | | 715/800 |
| 2015/0050633 A1* | 2/2015 | Christmas | G06F 3/14 |
| | | | 434/322 |
| 2018/0088764 A1 | 3/2018 | Lu et al. | |
| 2018/0088784 A1 | 3/2018 | Zhu et al. | |
| 2018/0091660 A1* | 3/2018 | Lu | G06F 3/04883 |
| 2018/0203578 A1* | 7/2018 | Murphy | G06F 3/0481 |
| 2021/0051293 A1 | 2/2021 | Oh | |

FOREIGN PATENT DOCUMENTS

| | | | | |
|---|---|---|---|---|
| JP | 2002-091560 A | 3/2002 | | |
| JP | 2011-028496 A | 2/2011 | | |
| JP | 2012-123677 A | 6/2012 | | |
| JP | 2017-016314 A | 1/2017 | | |
| JP | WO2014181466 A1 * | 2/2017 | | G06F 3/048 |
| KR | 10-2010-0107377 A | 10/2010 | | |
| KR | 10-2015-0098634 A | 8/2015 | | |
| KR | 10-1695931 B1 | 1/2017 | | |
| TW | M283230 | 12/2005 | | |
| WO | 2014/181466 A1 | 11/2014 | | |

OTHER PUBLICATIONS

Notification of Reasons for Refusal received for Japanese Patent Application No. 2018-546056, dated Dec. 4, 2018, 7 pages including English Translation.

Decision to Grant a Patent received for Japanese Patent Application No. 2018-546056, dated Feb. 5, 2019, 5 pages including English Translation.

Korean Notification of Reason for Refusal dated Oct. 19, 2020 in Korean patent application No. 10-2020-7025881.

Office Action dated Jan. 19, 2021 for the corresponding Taiwanese patent application No. 108106327.

Office Action dated Apr. 7, 2020 for the corresponding Taiwanese patent application No. 108106327.

Taiwanese Office Action dated Apr. 28, 2021 for the corresponding Taiwanese patent application No. 108106327.

Wikipedia (de) on Speicherprogrammierbare Steuerung, version of Feb. 25, 2018, 02:14 pm, 8 pp.

German Office Action dated May 25, 2021, in corresponding German Patent Application No. 11 2018 007 040.9.

* cited by examiner

SCREEN-CREATION ASSISTANCE DEVICE, DISPLAY SYSTEM, SCREEN-CREATION ASSISTANCE METHOD, AND RECORDING MEDIUM

CROSS-REFERENCE TO RELATED APPLICATION

The present application is based on PCT filing PCT/JP2018/009058, filed Mar. 8, 2018, the entire contents of which are incorporated herein by reference.

FIELD

The present invention relates to a screen-creation assistance device, a display system, a screen-creation assistance method, and a screen-creation assistance program to assist creation of a screen to be displayed on a display device.

BACKGROUND

A programmable display device is normally connected to external devices such as a programmable logic controller, a sensor, a driving device, an input device, and an output device, and is used to display a state of the system made up of the programmable display device and the external devices. A screen to be displayed by the programmable display device is created using screen creation software. The created screen is transferred to the programmable display device.

Patent Literature 1 describes a technique of displaying a plurality of display screens in parallel, which are respectively created by a plurality of control units, in a display area of a single display device, and also describes a technique of displaying a single display screen on each of display devices.

Meanwhile, in some cases such as constructing a large Andon system, in order to extend the display area, display areas of a plurality of display devices are combined to display a single screen.

CITATION LIST

Patent Literature

Patent Literature 1: Japanese Patent Application Laid-open No. 2012-123677

SUMMARY

Technical Problem

However, in the above technique of displaying a single screen using a plurality of display devices, it is usually necessary to create individual screens as many as the number of display devices. This leads to a problem with an increase in labor hours required for creating the screens. Patent Literature 1 only discloses the technique of displaying a plurality of display screens in parallel in the display area of a single display device. Patent Literature 1 does not disclose a method to combine the display areas of a plurality of display devices to display a single screen.

The present invention has been achieved to solve the above problems, and an object of the present invention is to provide a screen-creation assistance device and a display system that make it possible to reduce the labor hours required for screen creation at the time of using a plurality of display devices to display a single screen.

Solution to Problem

In order to solve the above-described problem and achieve the object, a screen-creation assistance device according to the present invention includes: a screen-data-element generation unit to generate a first screen data element that is a screen data element of a first screen; a division unit to divide the first screen into a plurality of second screens to be displayed respectively on a plurality of display devices, and to generate a plurality of second screen data elements that are respective screen data elements of the second screens; and an output unit to output the second screen data elements.

Advantageous Effects of Invention

The screen-creation assistance device according to the present invention has an effect where it is possible to reduce the labor hours required for screen creation at the time of using a plurality of display devices to display a single screen.

DESCRIPTION OF EMBODIMENTS

A screen-creation assistance device, a display system, a screen-creation assistance method, and a screen-creation assistance program according to embodiments of the present invention will be described in detail below with reference to the accompanying drawings. The present invention is not limited to the embodiments.

First Embodiment

Figure 1:
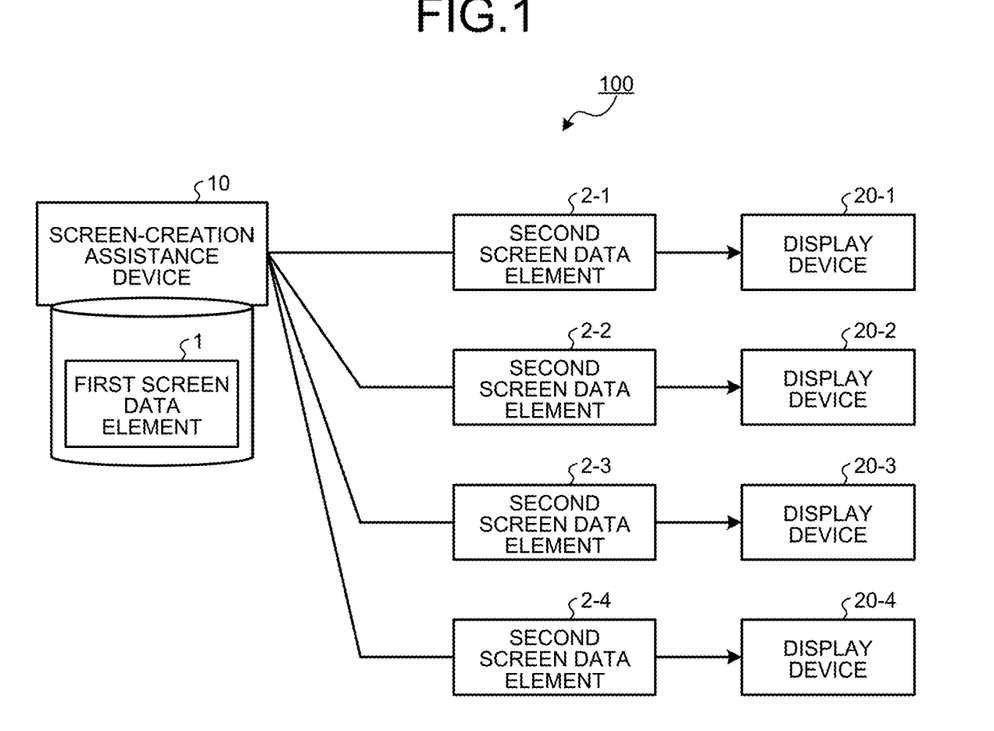
FIG. 1 is a diagram illustrating a configuration of a display system according to a first embodiment of the present invention.

FIG. 1 is a diagram illustrating a configuration of a display system 100 according to a first embodiment of the present invention. The display system 100 includes a screen-creation assistance device 10 and a plurality of display devices 20-1, 20-2, 20-3, and 20-4. Hereinafter, the display devices 20-1 to 20-4 are simply referred to as "display device 20" when the display devices 20-1 to 20-4 do not need to be distinguished from each other. The display device 20 can display a screen on the basis of a screen data element. For example, the display device 20 is a programmable display device.

In a case where display areas of a plurality of display devices 20 are collectively regarded as a system display area that is a display area of the display system 100, the screen-creation assistance device 10 creates a first screen data element 1 that is a screen data element of a first screen that is a screen to be displayed in the system display area. The screen-creation assistance device 10 is an information processing device having screen creation software installed therein. The screen creation software is designed to create a screen and the like to be displayed on the display device 20. The screen-creation assistance device 10 generates second screen data elements 2-1, 2-2, 2-3, and 2-4 from the first screen data element 1. The second screen data elements 2-1, 2-2, 2-3, and 2-4 are screen data elements of second screens to be respectively displayed on the display devices 20. Hereinafter, the second screen data elements 2-1 to 2-4 are simply referred to as "second screen data element 2" when the second screen data elements 2-1 to 2-4 do not need to be distinguished from each other.

The screen-creation assistance device 10 outputs the created second screen data elements 2-1 to 2-4 respectively to the display devices 20-1 to 20-4. Specifically, the screen-creation assistance device 10 outputs the second screen data element 2-1 to the display device 20-1, outputs the second screen data element 2-2 to the display device 20-2, outputs the second screen data element 2-3 to the display device 20-3, and outputs the second screen data element 2-4 to the display device 20-4.

Each of the display devices 20 displays the second screen by using the second screen data element 2, so that the first screen is displayed in the system display area that combines the display areas of the display devices 20. The second screen data element 2 is automatically generated by creating the first screen data element 1 by a user using the screen-creation assistance device 10. The screen-creation assistance device 10 has such a function as described above, and thus makes it possible to reduce the labor hours required for screen creation.

Figure 2:
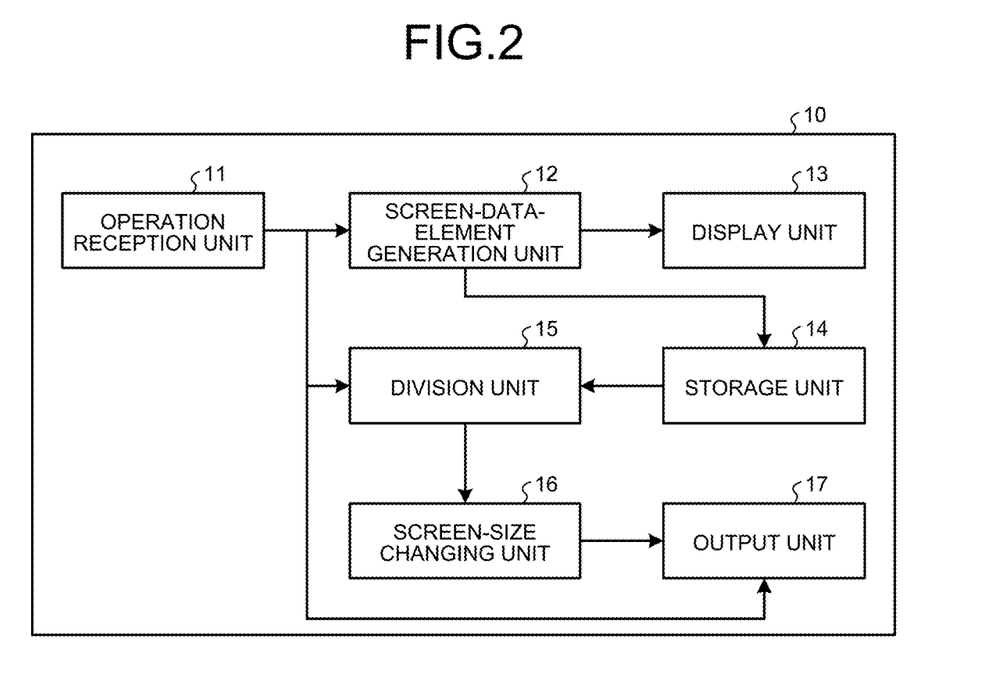
FIG. 2 is a diagram illustrating a functional configuration of a screen-creation assistance device illustrated in FIG. 1.

FIG. 2 is a diagram illustrating a functional configuration of the screen-creation assistance device 10 illustrated in FIG. 1. The screen-creation assistance device 10 includes an operation reception unit 11, a screen-data-element generation unit 12, a display unit 13, a storage unit 14, a division unit 15, a screen-size changing unit 16, and an output unit 17.

The operation reception unit 11 receives an input operation that is an operation performed by a user through an input device, generates operation information indicating the input operation, and outputs the generated operation information to the screen-data-element generation unit 12, the division unit 15, and the output unit 17. The operation reception unit 11 is connected to external input devices such as a keyboard and a mouse. It is allowable that the operation reception unit 11 includes an input device such as a touch sensor superimposed on the display unit 13.

The screen-data-element generation unit 12 generates the first screen data element 1. The screen-data-element generation unit 12 can generate the first screen data element 1 on the basis of an input operation received by the operation reception unit 11. When the screen-data-element generation unit 12 generates the first screen data element 1, the screen-data-element generation unit 12 outputs the generated first screen data element 1 to the display unit 13 and the storage unit 14. The display unit 13 displays the first screen on the basis of the first screen data element 1 output by the screen-data-element generation unit 12. The storage unit 14 stores therein the first screen data element 1 output by the screen-data-element generation unit 12.

Figure 3:
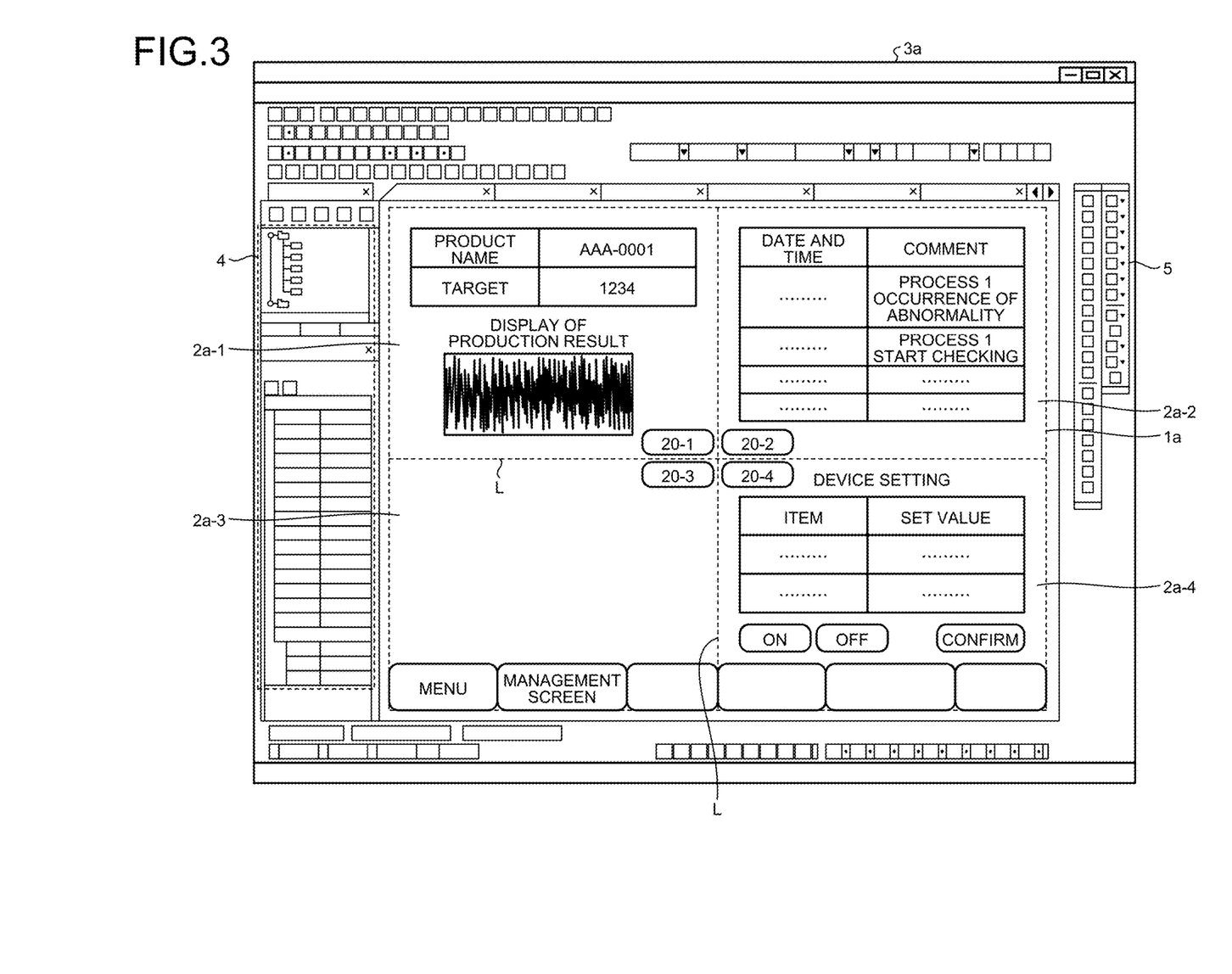
FIG. 3 is a diagram illustrating an example of a screen-creation screen displayed by a display unit illustrated in FIG. 2.

FIG. 3 is a diagram illustrating an example of a screen-creation screen 3a displayed by the display unit 13 illustrated in FIG. 2. A first screen 1a along with an operation menu 4, a toolbox 5, and the like are displayed as a part of the screen-creation screen 3a for creating the first screen 1a. In a state where the screen-creation screen 3a including the first screen 1a is displayed, a user performs an input operation on the operation menu 4, the toolbox 5, and the like to make a change to the first screen 1a. The screen-data-element generation unit 12 then updates the first screen data element 1 on the basis of the input operation. Each time the screen-data-element generation unit 12 updates the first screen data element 1, the display unit 13 updates the first screen 1a.

By using the screen-creation screen 3a illustrated in FIG. 3, a user can also designate the area of the second screens 2a-1 to 2a-4 that is a part of the area of the first screen 1a, and that is a screen to be displayed on each of the display devices 20-1 to 20-4. Hereinafter, the second screens 2a-1 to 2a-4 are simply referred to as "second screen 2a" when the second screens 2a-1 to 2a-4 do not need to be distinguished from each other. In FIG. 3, the first screen 1a is divided into four areas, and the four areas are defined respectively as the second screens 2a-1 to 2a-4. The boundary between the four areas is illustrated by dotted lines. It is sufficient that a user's input operation of designating the respective areas of the second screens 2a-1 to 2a-4 can be performed by designating an area of the first screen 1a, which serves as each of the second screens 2a-1 to 2a-4. For example, when a user performs an input operation of selecting the number of divided areas, the screen-data-element generation unit 12 displays a boundary line L that divides the first screen 1a into areas equal to the selected number of divided areas. The initial position of the boundary line L can be at such a position as to equally divide the area. When a user performs an input operation of changing the position of the boundary line L, the position of the boundary line L is changed in response to the input operation. Instead of designating the number of divided areas, it is also allowable for a user to initially designate the position of the boundary line L through a user's input operation. The position of the boundary line L is represented by using coordinates. The screen-creation assistance device 10 can store the coordinates representing the position of the boundary line L in the storage unit 14.

A user can use the screen-creation screen 3a to associate a plurality of second screens 2a with the display devices 20 as respective output destinations of the second screens 2a. The display device 20 as an output destination can also be described as a display device 20 that displays the second screen 2a. In the example illustrated in FIG. 3, the second screen 2a-1 is associated with the display device 20-1, the second screen 2*a*-2 is associated with the display device 20-2, the second screen 2*a*-3 is associated with the display device 20-3, and the second screen 2*a*-4 is associated with the display device 20-4.

Referring back to FIG. 2, when a user creates the first screen 1*a* and performs an input operation of designating the position to divide the first screen 1*a* and display the second screen 2*a* on the display device 20, then the division unit 15 performs a division process on the first screen 1*a*. Specifically, the division unit 15 reads the first screen data element 1 stored in the storage unit 14, and divides the area of the first screen 1*a* by the designated boundary line L into a plurality of areas as the second screens 2*a*. The division unit 15 generates a plurality of second screen data elements 2-1 to 2-4 that are respective screen data elements of the second screens 2*a* generated by dividing the first screen 1*a*. The division unit 15 also associates the second screen data elements 2-1 to 2-4 respectively with the display devices 20-1 to 20-4 as output destinations. The division unit 15 outputs the second screen data elements 2-1 to 2-4 generated to the screen-size changing unit 16.

The screen-size changing unit 16 changes the size of each of the second screens 2*a*-1 to 2*a*-4 in accordance with the size of the display area of the display device 20 associated with each of the second screens 2*a*-1 to 2*a*-4 among the display devices 20-1 to 20-4. It is supposed that the size of the display area of the display device 20 is stored in the screen-creation assistance device 10 in advance. In the example illustrated in FIG. 3, the second screen 2*a*-1 is associated with the display device 20-1. Thus, the screen-size changing unit 16 changes the size of the second screen 2*a*-1 in accordance with the size of the display area of the display device 20-1. The screen-size changing unit 16 changes the size of the second screens 2*a*-2, 2*a*-3, and 2*a*-4 in the same manner as the second screen 2*a*-1. The screen-size changing unit 16 outputs the second screen data elements 2-1 to 2-4 of the second screens 2*a*-1 to 2*a*-4 whose size has been changed, to the output unit 17.

The output unit 17 outputs each of the second screen data elements 2-1 to 2-4 output by the screen-size changing unit 16 to any one of the display devices 20-1 to 20-4. Specifically, the output unit 17 outputs each of the second screen data elements 2-1 to 2-4 to one of the display devices 20 as output destinations associated respectively with the second screen data elements 2-1 to 2-4.

Figure 4:
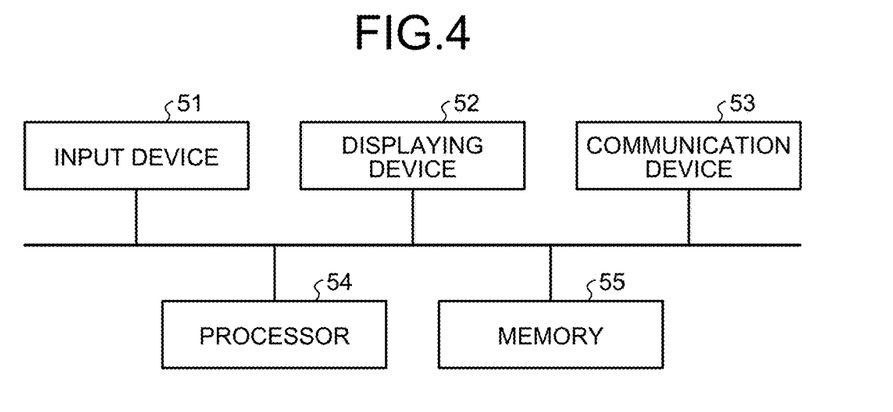
FIG. 4 is a diagram illustrating a hardware configuration of the screen-creation assistance device and display devices illustrated in FIG. 1.

FIG. 4 is a diagram illustrating a hardware configuration of the screen-creation assistance device 10 and the display devices 20-1 to 20-4 illustrated in FIG. 1. The functions of the screen-creation assistance device 10 and the display devices 20-1 to 20-4 can be implemented by using an input device 51, a displaying device 52, a communication device 53, a processor 54, and a memory 55.

The input device 51 is an input button, a keyboard, a touch sensor, and the like. In response to an input operation on the input device 51, the input device 51 generates and outputs an operation signal indicating the input operation to the processor 54. The displaying device 52 displays a screen on the basis of a screen data element such as the first screen data element 1, the second screen data element 2, or the like. The displaying device 52 is, for example, an organic EL (Electro Luminescence) displaying device or a liquid crystal displaying device. The communication device 53 is a communication interface for communicating with an external device. The communication device 53 communicates with an external device by wire or wirelessly.

The processor 54 is a CPU (Central Processing Unit), and is also referred to as a central processor, a processing device, an arithmetic device, a microprocessor, a microcomputer, a DSP (Digital Signal Processor), and the like.

The memory 55 is, for example, a nonvolatile or volatile semiconductor memory such as a RAM (Random Access Memory), a ROM (Read Only Memory), a flash memory, an EPROM (Erasable Programmable ROM), and an EEPROM® (Electrically EPROM), a magnetic disk, a flexible disk, an optical disk, a compact disk, a MiniDisk, or a DVD (Digital Versatile Disk).

The processor 54 reads and executes computer programs stored in the memory 55, such as a screen-creation assistance program, and can thereby implement the functions of the screen-creation assistance device 10 and the display devices 20-1 to 20-4. The memory 55 is also used as a temporary memory for the processor 54 to perform each process.

Figure 5:
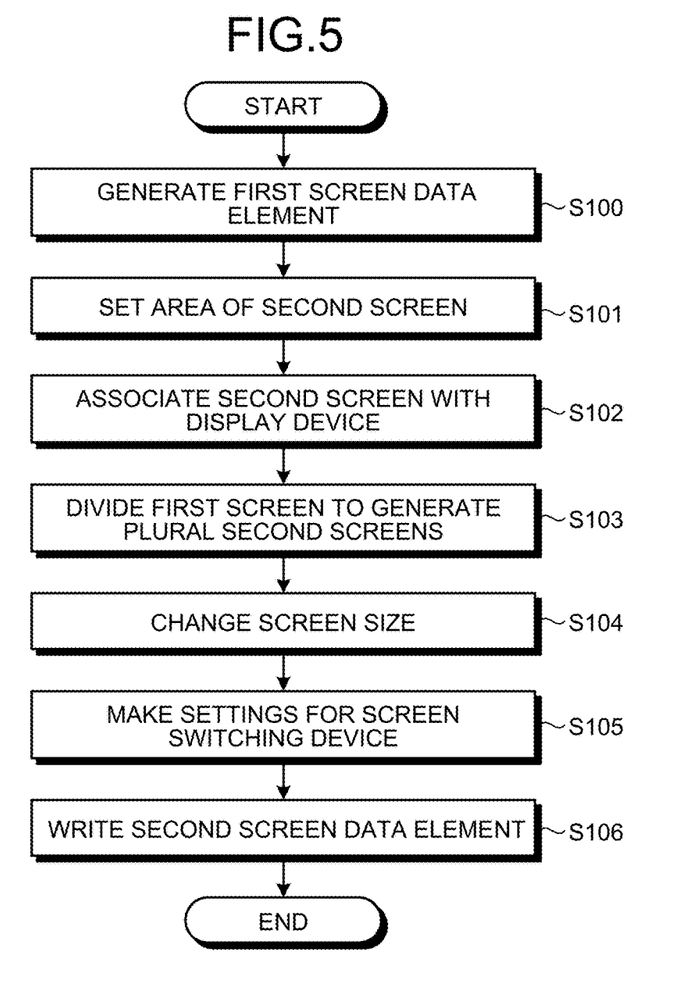
FIG. 5 is a flowchart illustrating an operation of the screen-creation assistance device illustrated in FIG. 1.

FIG. 5 is a flowchart illustrating an operation of the screen-creation assistance device 10 illustrated in FIG. 1. The screen-data-element generation unit 12 in the screen-creation assistance device 10 generates the first screen data element 1 on the basis of operation information output by the operation reception unit 11 (Step S100).

On the basis of the operation information output by the operation reception unit 11, the screen-data-element generation unit 12 sets respective areas for the second screens 2*a* generated by dividing the first screen 1*a* (Step S101). The screen-data-element generation unit 12 associates the second screens 2*a* with the display devices 20, respectively (Step S102).

The division unit 15 divides the first screen 1*a* to generate the second screens 2*a* (Step S103). Specifically, on the basis of the areas having been set by the screen-data-element generation unit 12, the division unit 15 divides the first screen 1*a* to generate areas of the second screens 2*a* and generate the second screen data elements 2 that are screen data elements for displaying the second screens 2*a*. Before being written into the display device 20, the second screen data elements 2 are temporarily stored in the screen-creation assistance device 10. The division unit 15 outputs the second screen data elements 2 generated to the screen-size changing unit 16.

The screen-size changing unit 16 changes the size of each of the second screens 2*a* for the second screen data elements 2, which are output by the division unit 15, in accordance with the size of the display area of the display device 20 that is an output destination of each of the second screen data elements 2 among the display devices 20 (Step S104). The screen-size changing unit 16 outputs the second screen data elements 2 whose size has been changed, to the output unit 17.

Figure 6:
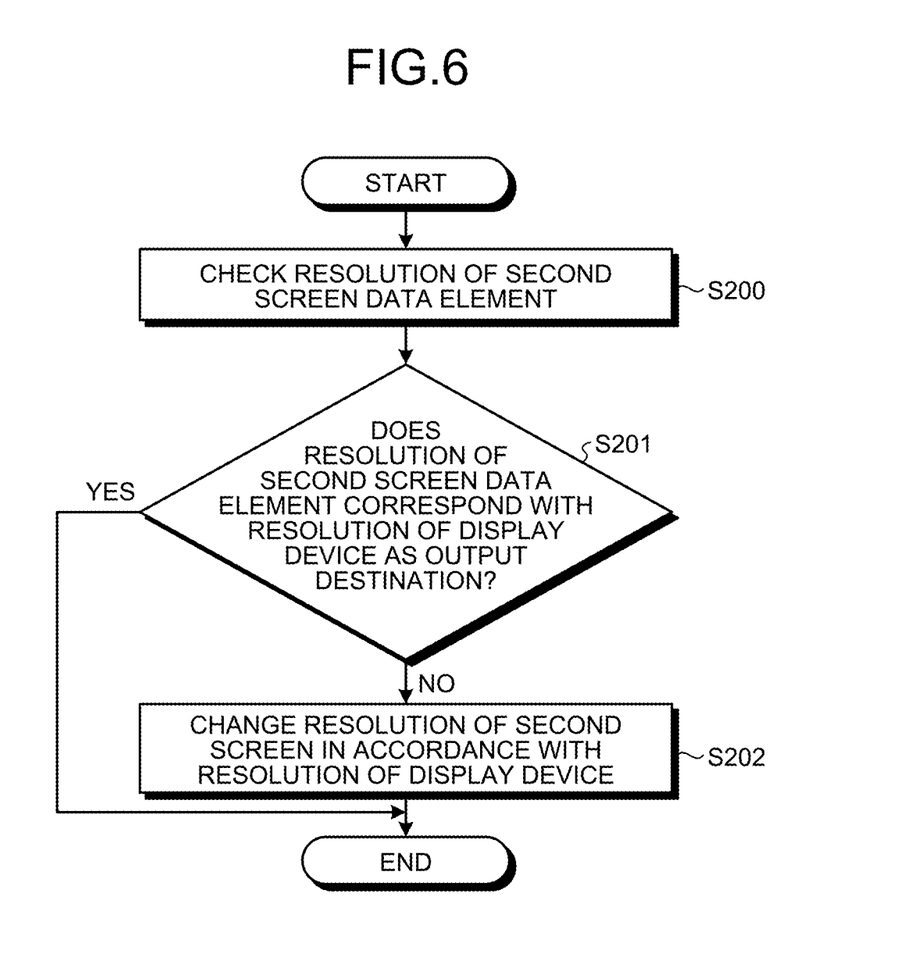
FIG. 6 is a flowchart illustrating a detailed operation of changing a screen size illustrated in FIG. 5.

FIG. 6 is a flowchart illustrating a detailed operation of changing the screen size (Step S104) illustrated in FIG. 5. The screen-size changing unit 16 checks the resolution of the second screen data element 2 (Step S200). The screen-size changing unit 16 determines whether the resolution of the second screen data element 2 corresponds with the resolution that is the size of the display area of the display device 20 as an output destination (Step S201).

When the resolution of the second screen data element 2 does not correspond with the resolution of the display device 20 as an output destination (NO at Step S201), the screen-size changing unit 16 changes the resolution of the second screen 2*a* in accordance with the resolution of the display device 20 (Step S202). When the resolution of the second screen data element 2 corresponds with the resolution of the display device 20 as an output destination (YES at Step S201), the process at Step S202 is omitted.

Referring back to FIG. 5, the output unit 17 makes the settings for a screen switching device for each of the display devices 20 that are output destinations of the second screen data elements 2 output by the screen-size changing unit 16 (Step S105). The screen switching device is a programmable logic controller or other devices. The screen-creation assistance device 10 makes the settings for a screen switching function for the display devices 20. Each of the display devices 20 has the screen switching function. Specifically, the display devices 20 are connected to the screen switching device such as a programmable logic controller, and can switch between the screens with reference to device values stored in the programmable logic controller. The screen-creation assistance device 10 makes the settings for the screen switching device by setting common device values to be referenced respectively by the display devices 20. When the settings for the screen switching device have been made, then each of the display devices 20 switches between the screens to be displayed in synchronization with a screen switching operation on the screen switching device. In the present embodiment, it is supposed that a common screen switching device is set for the display devices 20-1 to 20-4. In this case, the timing of switching between the screens to be displayed on the display devices 20-1 to 20-4 is synchronized between the display devices 20-1 to 20-4.

The output unit 17 writes the second screen data elements 2 respectively into the display devices 20 as output destinations (Step S106). At this time, the output unit 17 designates the IP address of the display device 20 as an output destination, the port number of a port connected to the display device 20 as an output destination, the identification number of the second screen 2a to be displayed, and the like, and then writes the second screen data element 2 into the display device 20.

In the example described above, after the settings for the screen switching device have been made for each of the display devices 20, the output unit 17 writes the second screen data element 2 into each of the display devices 20. However, the present embodiment is not limited to this example. It is allowable that the output unit 17 makes the settings for the screen switching device and writes the second screen data 2 in sequence separately to each of the display devices 20.

When the screen-creation assistance device 10 writes the second screen data element 2 into each of the display devices 20, each of the display devices 20 displays the second screen 2a on the basis of the written second screen data element 2.

Figure 7:
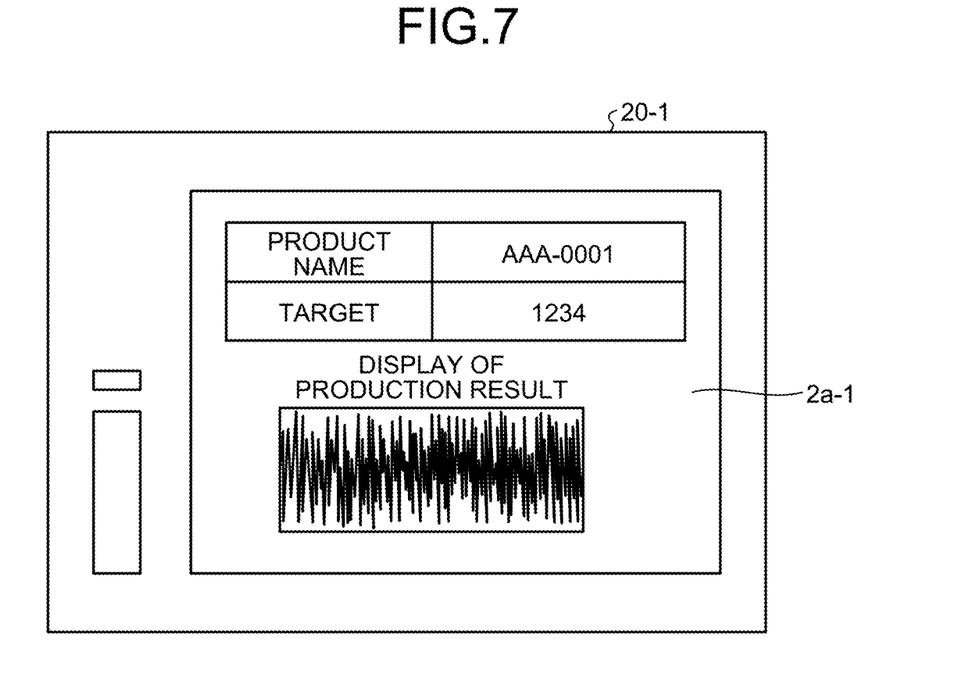
FIG. 7 is a diagram illustrating a second screen displayed on the display device illustrated in FIG. 1.
Figure 8:
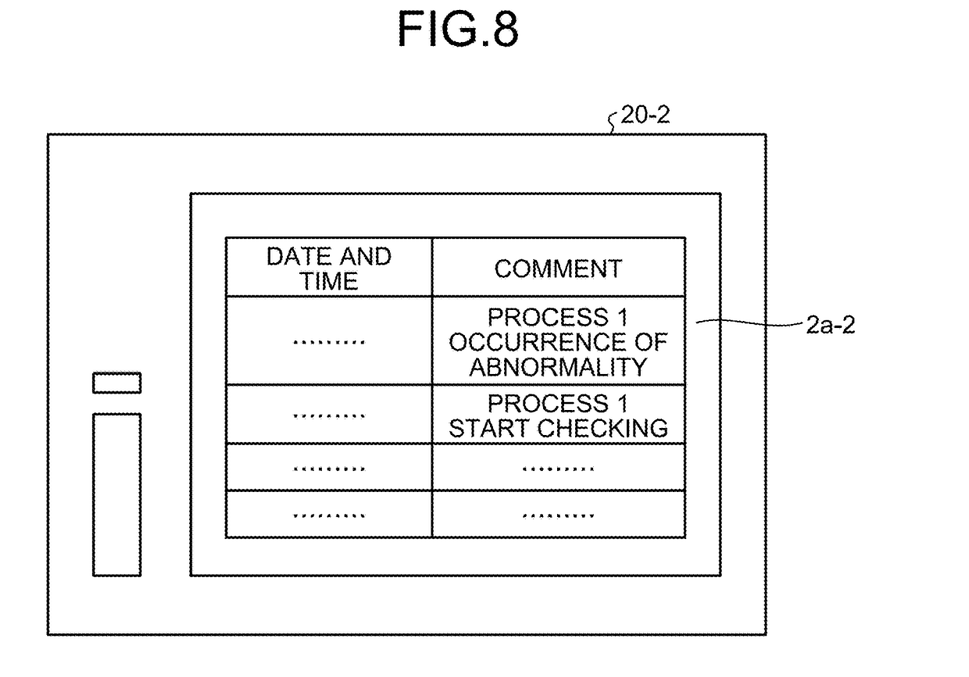
FIG. 8 is a diagram illustrating a second screen displayed on the display device illustrated in FIG. 1.
Figure 9:
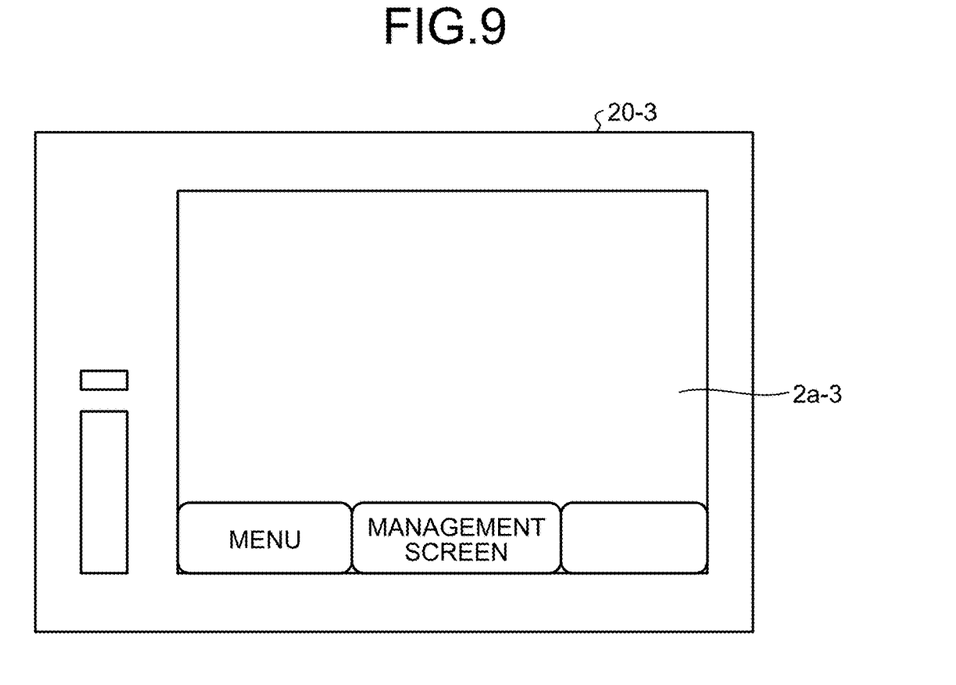
FIG. 9 is a diagram illustrating a second screen displayed on the display device illustrated in FIG. 1.
Figure 10:
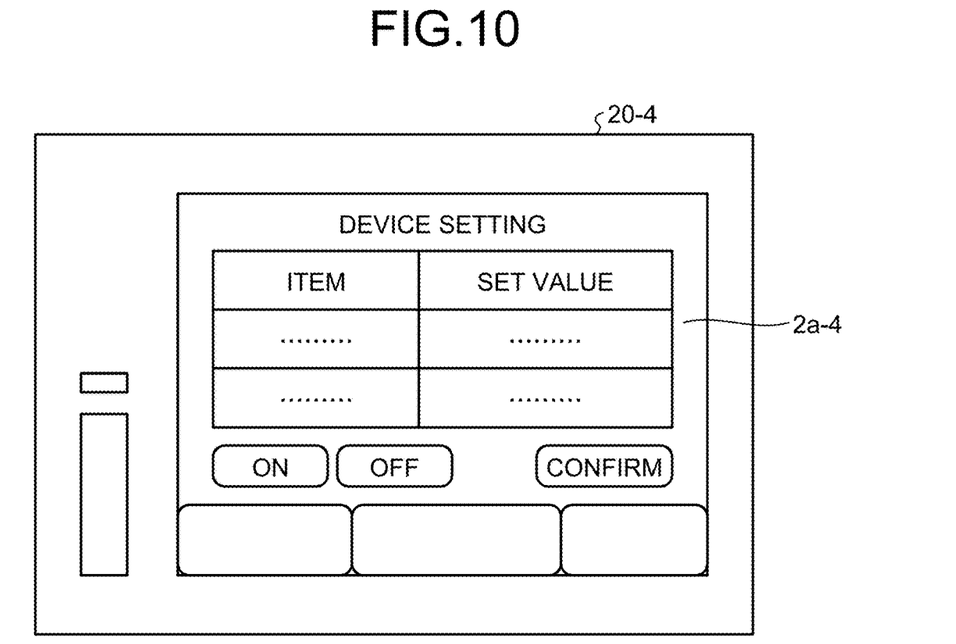
FIG. 10 is a diagram illustrating a second screen displayed on the display device illustrated in FIG. 1.

FIG. 7 is a diagram illustrating the second screen 2a-1 displayed on the display device 20 illustrated in FIG. 1. FIG. 8 is a diagram illustrating the second screen 2a-2 displayed on the display device 20 illustrated in FIG. 1. FIG. 9 is a diagram illustrating the second screen 2a-3 displayed on the display device 20 illustrated in FIG. 1. FIG. 10 is a diagram illustrating the second screen 2a-4 displayed on the display device 20 illustrated in FIG. 1.

FIG. 7 illustrates the second screen 2a-1 displayed on the display device 20-1. FIG. 8 illustrates the second screen 2a-2 displayed on the display device 20-2. FIG. 9 illustrates the second screen 2a-3 displayed on the display device 20-3. FIG. 10 illustrates the second screen 2a-4 displayed on the display device 20-4. As illustrated in FIGS. 7 to 10, in the screen-creation assistance device 10 according to the present embodiment, when a single first screen 1a is created and the divided areas are designated, then the first screen 1a is divided into the second screens 2a-1 to 2a-4. Thus, the second screens 2a-1 to 2a-4 are automatically generated with their resolution having been converted. The screen-creation assistance device 10 also outputs the second screens 2a-1 to 2a-4 generated to the display devices 20-1 to 20-4, respectively. The second screens 2a-1 to 2a-4 are respectively displayed on different display devices 20 from each other. Therefore, at the time of using the display devices 20 to display a single screen, the screen-creation assistance device 10 can reduce the labor hours required for screen creation.

In the conventional system, in order to synchronize the screen switching timing between the display devices 20 that respectively display a plurality of screens generated by dividing a single screen, it is necessary to manually make the settings to write a desired screen to be displayed for the screen switching device having been set to each of the display devices 20. This requires a considerable amount of time and effort. However, according to the first embodiment, the settings for the screen switching device are also automatically made. For this reason, an administrator of the display system 100 does not need to manually make the settings for the screen switching device. This saves a user's time and effort.

In the screen-creation assistance device 10 according to the first embodiment, the first screen data element 1 is stored in the storage unit 14, while the second screen data element 2 is stored temporarily in the screen-creation assistance device 10, then output to the display device 20, and thereafter discarded. Due to this configuration, the screen-creation assistance device 10 manages a reduced number of screens as compared to the case where all the second screen data elements 2 are stored.

Second Embodiment

Figure 11:
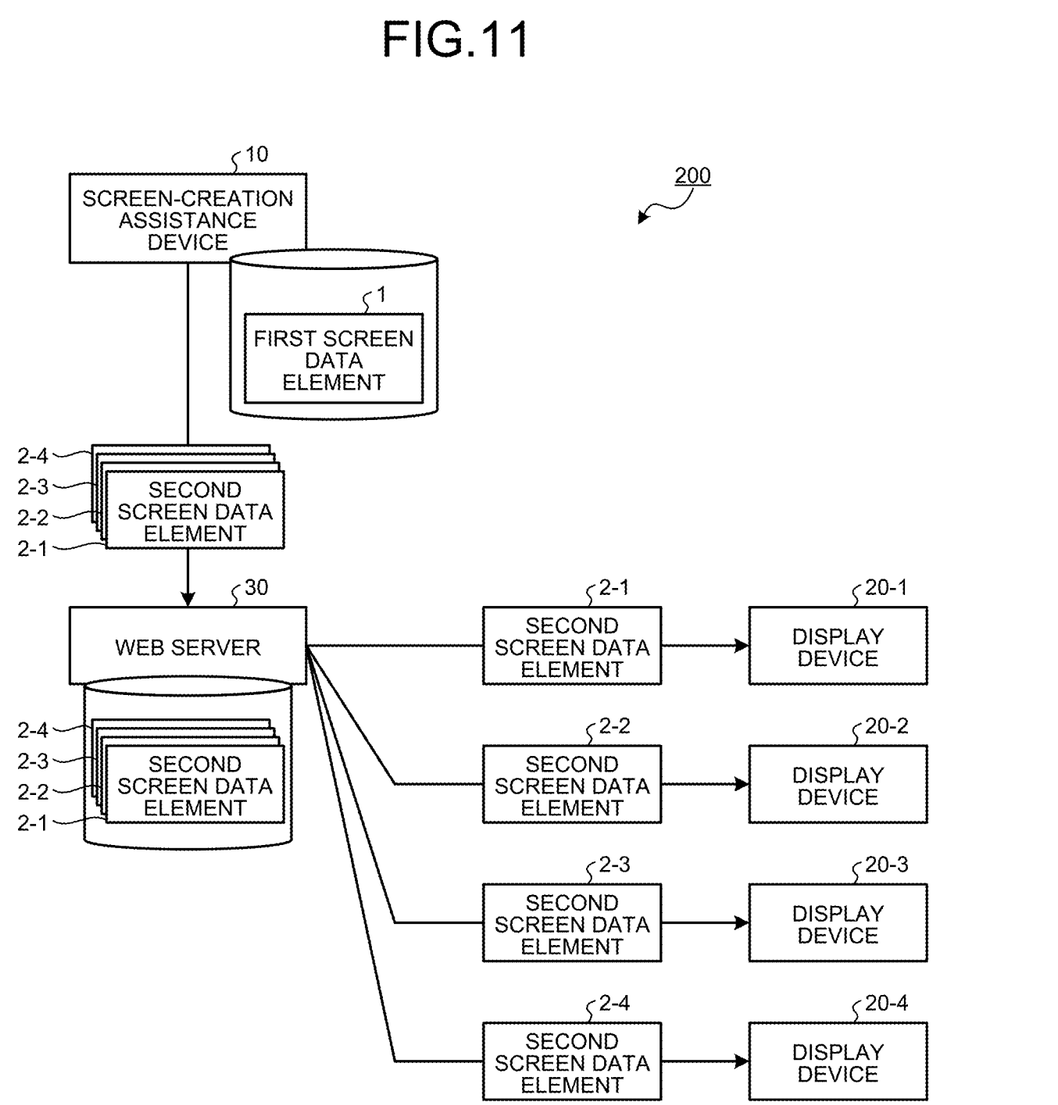
FIG. 11 is a diagram illustrating a configuration of a display system according to a second embodiment of the present invention.

FIG. 11 is a diagram illustrating a configuration of a display system 200 according to a second embodiment of the present invention. The display system 200 includes the screen-creation assistance device 10, the display devices 20-1 to 20-4, and a web server 30. In the following descriptions, explanations of parts identical to those of the first embodiment are omitted, and parts different from the first embodiment are mainly described.

The screen-creation assistance device 10 outputs the second screen data elements 2-1 to 2-4 to the web server 30 instead of outputting the second screen data elements 2-1 to 2-4 respectively to the display devices 20-1 to 20-4. The web server 30 is a programmable display device having a web server function. The web server 30 includes a storage unit that stores therein the second screen data elements 2-1 to 2-4 output by the screen-creation assistance device 10. Each of the display devices 20-1 to 20-4 reads one of the second screen data elements 2-1 to 2-4 from the web server 30, and displays the second screen 2a using the second screen data element 2 read. The display devices 20-1 to 20-4 are mobile terminals having a web client function.

It is also possible to implement the function of the web server 30 by using the input device 51, the displaying device 52, the communication device 53, the processor 54, and the memory 55 which are illustrated in FIG. 4.

Third Embodiment

Figure 12:
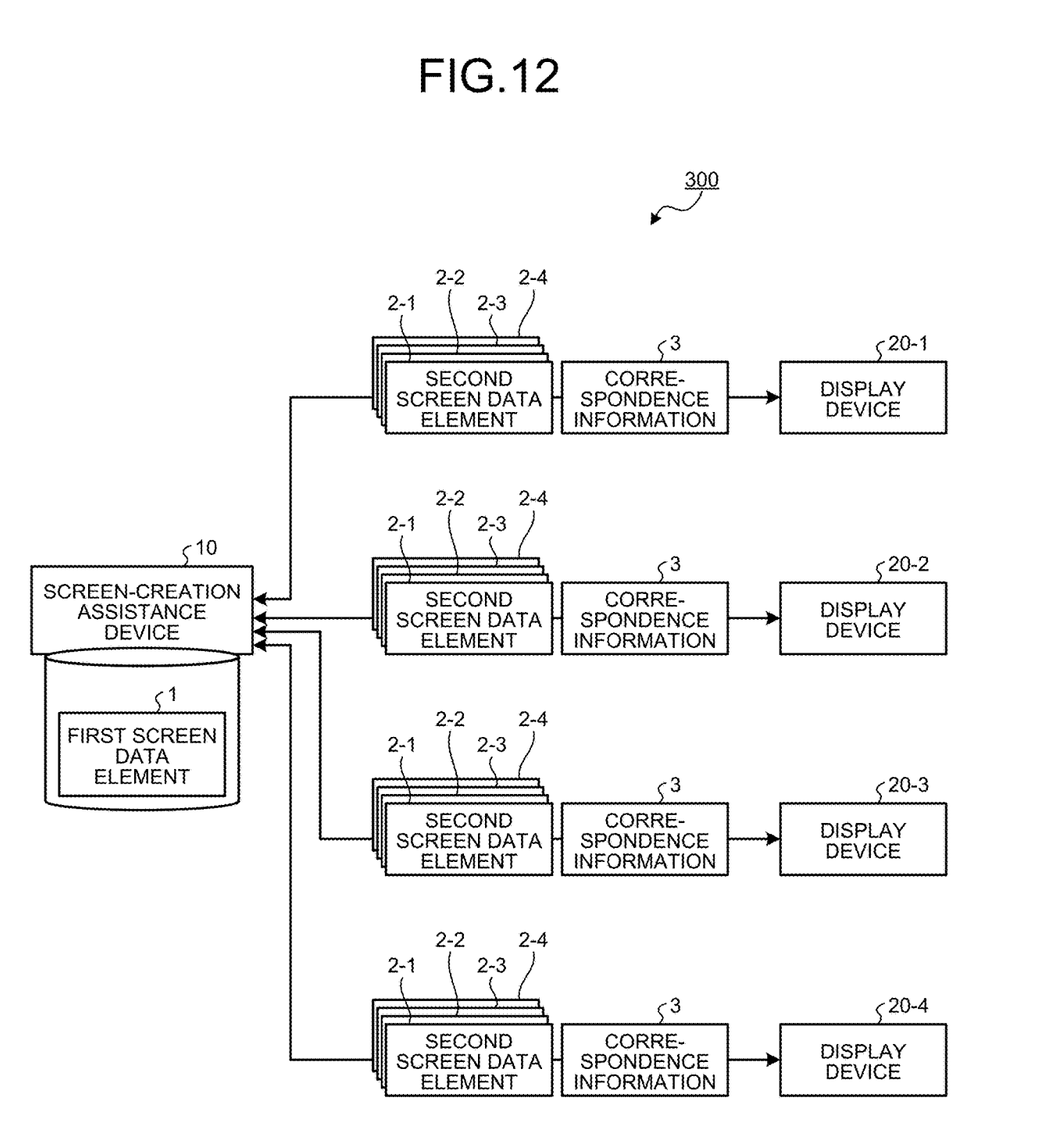
FIG. 12 is a diagram illustrating a configuration of a display system according to a third embodiment of the present invention.

FIG. 12 is a diagram illustrating a configuration of a display system 300 according to a third embodiment of the present invention. The display system 300 includes the screen-creation assistance device 10 and the display devices 20-1 to 20-4. In the following descriptions, explanations of parts identical to those of the first embodiment are omitted, and parts different from the first embodiment are mainly described. The configuration of the screen-creation assistance device 10 is identical to the configuration of the screen-creation assistance device 10 according to the first embodiment illustrated in FIG. 2, and thus explanations are made while using the reference signs in FIG. 2.

In the first embodiment, each of the second screen data elements 2-1 to 2-4 generated from the first screen data element 1 is output to a corresponding display device 20 of the display devices 20-1 to 20-4. In contrast to this, in the third embodiment, the screen-creation assistance device 10 outputs all the second screen data elements 2-1 to 2-4 to each of the display devices 20-1 to 20-4. In other words, not only the second screen data element 2-1 to be displayed on the display device 20-1 is input to the display device 20-1, but the second screen data element 2-2 to be displayed on the display device 20-2, the second screen data element 2-3 to be displayed on the display device 20-3, and the second screen data element 2-4 to be displayed on the display device 20-4 are also input to the display device 20-1.

The screen-data-element generation unit 12 in the screen-creation assistance device 10 generates correspondence information 3 in which the display devices 20-1 to 20-4 are associated respectively with the second screen data elements 2-1 to 2-4 to indicate which second screen data element 2 of the second screen data elements 2-1 to 2-4 is displayed on the display devices 20-1 to 20-4. The screen-data-element generation unit 12 then outputs the correspondence information 3 generated to each of the display devices 20-1 to 20-4.

The correspondence information 3 and the second screen data elements 2-1 to 2-4 described above are saved in each of the display devices 20-1 to 20-4. The screen-creation assistance device 10 can extract the correspondence information 3 and the second screen data elements 2-1 to 2-4 from each of the display devices 20-1 to 20-4, and use the extracted information and data elements as needed. For example, the screen-data-element generation unit 12 is capable of creating the first screen data element 1 on the basis of the second screen data element 2 and the correspondence information 3 extracted from at least one of the display devices 20-1 to 20-4. Specifically, the screen-data-element generation unit 12 can combine the second screen data elements 2-1 to 2-4 to recover the first screen data element 1. The screen-data-element generation unit 12 can use the first screen data element 1 recovered to reedit the screens to be displayed on the display devices 20-1 to 20-4.

Figure 13:
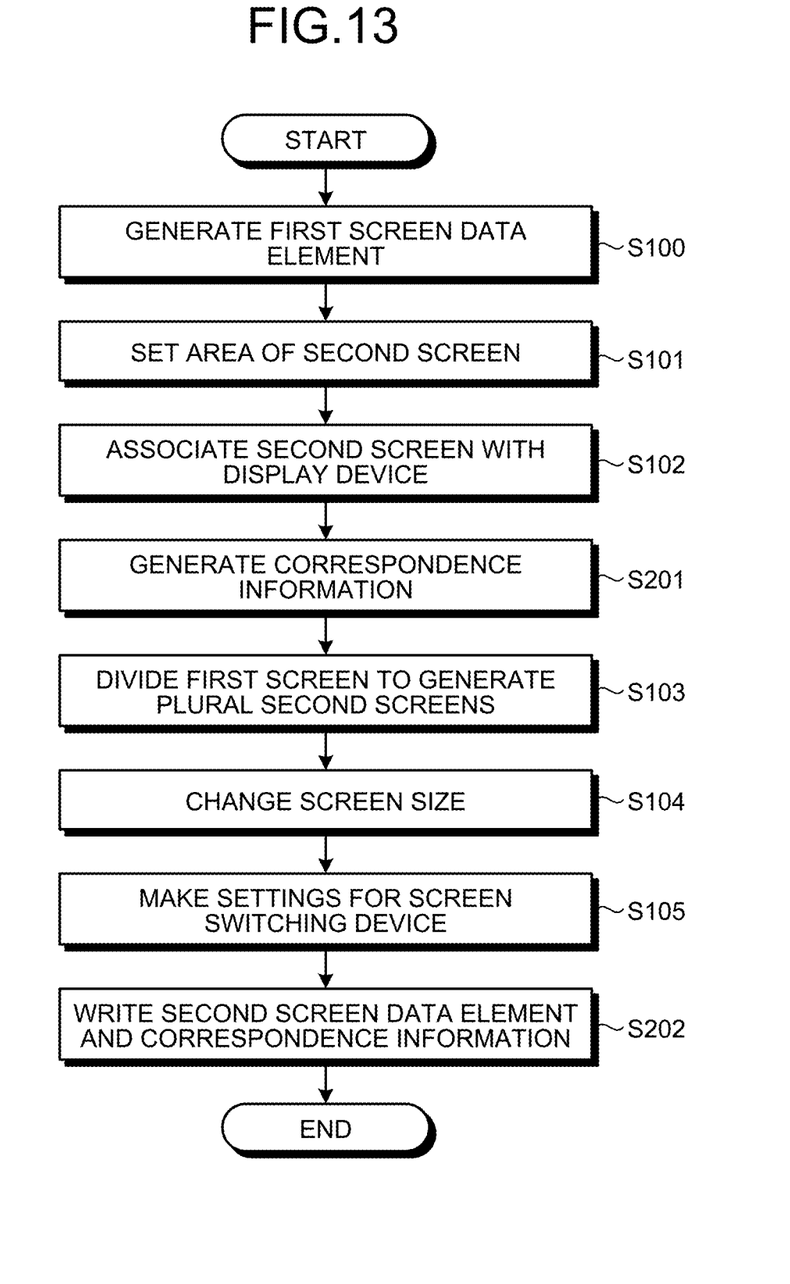
FIG. 13 is a flowchart illustrating an operation of the screen-creation assistance device illustrated in FIG. 12.

FIG. 13 is a flowchart illustrating an operation of the screen-creation assistance device 10 illustrated in FIG. 12. In FIG. 13, operations identical to those illustrated in FIG. 5 are denoted by like reference signs, and thus descriptions thereof are omitted. Steps S100 to S102 are identical to those illustrated in FIG. 5, and thus descriptions thereof are omitted. After the second screens 2a are respectively associated with the display devices 20 (Step S102), the screen-data-element generation unit 12 in the screen-creation assistance device 10 generates the correspondence information 3 (Step S201).

Steps S103 to S105 are identical to those illustrated in FIG. 5, and thus descriptions thereof are omitted. After the settings for the screen switching device have been made (Step S105), the output unit 17 writes the second screen data elements 2 and the correspondence information 3 into each of the display devices 20 (Step S202).

As described above, according to the third embodiment of the present invention, the display device 20 stores therein all the second screen data elements 2, and the correspondence information 3 indicating a correspondence relation between the display device 20 and the second screen data element 2. Thus, even when the screen-creation assistance device 10 does not have the first screen data element 1 or the correspondence information 3 stored therein, the screen-creation assistance device 10 is still capable of combining the second screen data elements 2 extracted from the display device 20 to recover the first screen data element 1 on the basis of the correspondence information 3, and reediting a screen to be displayed on the display device 20.

The configurations described in the above embodiments are only examples of the content of the present invention. The configurations can be combined with other well-known techniques, and part of each of the configurations can be omitted or modified without departing from the scope of the present invention.

For example, in the first embodiment, the screen-creation assistance device 10 directly outputs the second screen data elements 2-1 to 2-4 to the display devices 20-1 to 20-4, respectively, while in the second embodiment, the screen-creation assistance device 10 outputs the second screen data elements 2-1 to 2-4 to the web server 30. However, the present invention is not limited to the above examples. It is allowable that the screen-creation assistance device 10 has a function of directly outputting the second screen data elements 2-1 to 2-4 to the display devices 20-1 to 20-4 respectively in combination with a function of outputting the second screen data elements 2-1 to 2-4 to the web server 30.

In the above embodiments, the example is described in which the first screen 1a is divided into four second screens 2a. However, the present invention is not limited to the above example. A screen may be divided by any number equal to or larger than two. In the above embodiments, the display devices 20-1 to 20-4 are set as screen switching devices between each other. However, the embodiments of the present invention are not limited to the above example. For example, it is allowable to set the display device 20-1 as a screen switching device for the display devices 20-2, 20-3, and 20-4. In this case, when a screen switching operation is performed on the display device 20-1, the screens of the display devices 20-1 to 20-4 are switched to each other.

In the above embodiments, the functions of the display systems 100 and 200, each of which includes the screen-creation assistance device 10, have been described. However, the invention according to the embodiments may also be implemented as a screen-creation assistance method that is executed by the screen-creation assistance device 10, or as a computer program that causes a computer to perform each step of the screen-creation assistance method.

REFERENCE SIGNS LIST 1 first screen data element, 1a first screen, 2, 2-1, 2-2, 2-3, 2-4 second screen data element, 2a, 2a-1, 2a-2, 2a-3, 2a-4 second screen, 3 correspondence information, 3a screen-creation screen, 4 operation menu, 5 toolbox, 10 screen-creation assistance device, 11 operation reception unit, 12 screen-data-element generation unit, 13 display unit, 14 storage unit, 15 division unit, 16 screen-size changing unit, 17 output unit, 20, 20-1, 20-2, 20-3, 20-4 display device, 30 web server, 51 input device, 52 displaying device, 53 communication device, 54 processor, 55 memory, 100, 200, 300 display system.

The invention claimed is:

1. A screen-creation assistance device comprising:
 a screen-data-element generation circuitry to generate a first screen data element that is a screen data element of a first screen;
 an operation reception circuitry capable of receiving an input operation of designating a position to divide the first screen;
 a division circuitry to divide the first screen at the position designated by the input operation into a plurality of second screens to be displayed respectively on a plurality of display devices, and to generate a plurality of second screen data elements that are respective screen data elements of the second screens; and
 an output circuitry to output the second screen data elements, wherein
 a timing of switching between the second screens to be displayed respectively on the plurality of display devices is synchronized on a basis of a value stored in a screen switching device connected to the plurality of display devices, the value corresponding individually to the display devices.

2. The screen-creation assistance device according to claim 1, further comprising:
 a display device to display the first screen.

3. The screen-creation assistance device according to claim 1, wherein the screen-data-element generation circuitry is capable of creating the first screen data element on a basis of the second screen data elements.

4. The screen-creation assistance device according to claim 1, wherein the screen-data-element generation circuitry is capable of reading the second screen data elements respectively from the display devices, and creating the first screen data element on a basis of the second screen data elements.

5. The screen-creation assistance device according to claim 1, further comprising a screen-size changing circuitry to change a size of each of the second screens in accordance with a size of a display area of the display device, which displays each of the second screens, among the display devices.

6. The screen-creation assistance device according to claim 1, wherein the screen-data-element generation circuitry is capable of reading the second screen data elements respectively from the display devices, and creating the first screen data element on a basis of the second screen data elements.

7. The screen-creation assistance device according to claim 1, further comprising a memory to store therein the first screen data element, wherein
 the screen-creation assistance device stores therein the second screen data elements temporarily, and discards the second screen data elements after the output circuitry outputs the second screen data elements.

8. The screen-creation assistance device according to claim 1, wherein the plurality of display devices includes a programmable display device.

9. The screen-creation assistance device according to claim 1, wherein the output circuitry outputs the second screen data elements respectively to the display devices.

10. A display system comprising:
 the screen-creation assistance device according to claim 1; and
 the plurality of display devices that respectively display the plurality of second screens.

11. The display system according to claim 10, further comprising a web server to store therein the second screen data elements output by the screen-creation assistance device, wherein
 each of the display devices reads one of the second screen data elements from the web server, and displays the second screen using the second screen data element read.

12. The display system according to claim 11, wherein the web server is a programmable display device having a web server function.

13. A screen-creation assistance method comprising:
 assisting, by a screen-creation assistance device, creation of a screen to be displayed on a display device;
 generating a first screen data element that is a screen data element of a first screen;
 receiving, by an operation reception circuitry, an input operation of designating a position to divide the first screen;
 dividing the first screen at the position designated by the input operation into a plurality of second screens to be displayed respectively on a plurality of display devices, and generating a plurality of second screen data elements that are respective screen data elements of the second screens; and
 outputting the second screen data elements, wherein
 a timing of switching between the second screens to be displayed respectively on the plurality of display devices is synchronized on a basis of a value stored in a screen switching device connected to the plurality of display devices, the value corresponding individually to the display devices.

14. A non-transitory computer-readable recording medium that stores therein a screen-creation assistance program for causing a computer to perform:
 generating a first screen data element that is a screen data element of a first screen;
 receiving an input operation of designating a position to divide the first screen;
 dividing the first screen at the position designated by the input operation into a plurality of second screens to be displayed respectively on a plurality of display devices, and generating a plurality of second screen data elements that are respective screen data elements of the second screens;
 outputting the second screen data elements; and
 synchronizing a timing of switching between the second screens to be displayed respectively on the plurality of display devices on a basis of a value stored in a screen switching device connected to the plurality of display devices, the value corresponding individually to the display devices.

* * * * *